Nov. 25, 1969  W. F. HUNTER ET AL  3,479,989

EXTRUSION COATING APPARATUS

Filed Nov. 28, 1967

WALKER F. HUNTER
EDWARD J. MIZMA
INVENTORS

BY

ATTORNEYS

United States Patent Office 3,479,989
Patented Nov. 25, 1969

3,479,989
EXTRUSION COATING APPARATUS
Walker F. Hunter and Edward J. Mizma, Hilton, N.Y., assignors to Eastman Kodak Company, Rochester, N.Y., a corporation of New Jersey
Filed Nov. 28, 1967, Ser. No. 686,106
Int. Cl. B05c 11/02
U.S. Cl. 118—608    8 Claims

ABSTRACT OF THE DISCLOSURE

An extrusion hopper for depositing onto a moving support a relatively wide stream of a liquid dispersion which is uniformly thick and free of defects resulting from pressure drops across the length of the hopper discharge slot and in which the particles are maintained uniformly dispersed comprises a substantially cylindrical chamber having an elongated discharge slot extending radially therefrom and a slotted tubular rotor rotatable coaxially within said chamber from the slots of which a dispersion fed into one end of the rotor issues at a plurality of points along the length of the hopper while at the same time being subjected to a shear rate which keeps the particles dispersed. An additional shear rate can be induced on the dispersion by placing a stationary rod concentrically within said rotor.

BACKGROUND OF THE INVENTION

Field of the invention

This invention relates to an extrusion coating apparatus for coating webs with dispersions containing relatively large quantities of particulate material relative to the binder which are subject to settling or agglomerating, for example, dispersions of magnetic materials, used in the manufacture of magnetic tapes, phosphor dispersions which contain very large quantities of particulate material relative to the binder, special photographic emulsions, etc., and is primarily concerned with the structure of the apparatus so as to achieve a greater degree of coating uniformity. The extrusion coating apparatus is of the known type comprising a body having a hollow distribution chamber therein, a rotor within the chamber for stirring the dispersion, and a radial metering slot extending from the chamber and terminating in an extrusion orifice. In particular, the invention relates to the location and manner in which a dispersion is fed into the supply chamber of a dispersion extrusion hopper, and to the arrangement for maintaining high shear rate conditions on the dispersion while it is passing through the extrusion hopper.

Description of the prior art

The extrusion hopper disclosed in commonly assigned U.S. Patent 3,227,136 of which the present invention is an improvement, comprises a body having a cylindrical chamber with a cylindrical rotor mounted coaxially therein, the periphery of which is spaced slightly from the interior walls of the chamber, a dispersion supply port for the chamber disposed substantially midway along the length of the chamber, and a longitudinal slot terminating in an extrusion orifice extending radially from the chamber.

The objects of the aforementioned patent included the provision of a dispersion coating apparatus for uniformly coating wide webs of material, and the apparatus was intended to maintain high shear rate conditions on the dispersion to prevent settling out or agglomeration of magnetic particles which would adversely affect the quality of the coating. As indicated in the abovementioned patent, the maintenance of high shear rate conditions on the dispersion is necessary to prevent the agglomeration of the dispersed particles which would cause variation in dispersion consistency, thus resulting in undesirable variations in coating uniformity on the carrier web, and would also cause clogging and related production difficulties in the hopper itself.

Despite the advantages provided by the extrusion hopper discussed above, namely the maintenance of high shear rate conditions to provide for the prevention of separation of solid particles from the fluid binder, there exist certain problems and shortcomings associated therewith which are solved by the present invention.

One such problem is the presence of an "entrance defect," which appears under nearly all operating conditions as a line in the coated product corresponding in position to the entrance port through which the dispersion enters the chamber in the hopper body (the inlet port of the aforementioned disclosure was located in the median plane widthwise of the coating hopper). Another shortcoming of the hopper disclosed in the aforementioned patent is the limited flow capacity of the hopper. Since the rotor therein, which comprises a cylinder having a smooth outer surface, substantially fills the hopper chamber in order to provide a narrow annular space for maintaining the necessary high shear rate conditions, the pressure drop from the central feed port to the ends of the chamber is high, the flow rate is accordingly limited, and, most importantly, the uniformity of the coating thickness across the web may be below acceptable standards because of non-uniform pressure conditions created by the pressure drop. Furthermore, some dispersions for which the hopper is intended for use tend to decrease in viscosity as the shear rate increases. Thus, it is important to maintain the shear rate conditions at a relatively high level both for the reasons set forth previously, and also to decrease the viscosity of the dispersion, thereby decreasing its resistance to flow through the hopper.

SUMMARY OF THE INVENTION

The present invention is intended to provide an improved extrusion coating hopper for coating webs with dispersions of particles subject to settling or agglomeration, for example, for coating wide webs of material with magnetic dispersions for producing magnetic tapes, and its objects, as they relate to such hoppers, include:

The elimination of "entrance defects";
The avoidance of high pressure drop in the dispersion in passing from the hopper entrance to the remote portions of the chamber;
The maintenance of sufficient shear rate conditions;
An increase in the possible extrusion rate; and
Generally the achievement of a uniform coating of finely dispersed particles, having a uniform consistency and being of proper and uniform thickness, in a simple and economic manner.

Further objects will be apparent from the description to follow and the appended claims.

The extrusion hopper according to the present invention comprises a hollow cylindrical distribution chamber formed within the hopper body, a metering slot terminating in an extrusion orifice and extending along the length of the chamber and radially outwardly from the chamber, at least one slotted, or otherwise perforated, tubular rotor mounted within the chamber and having an outer diameter slightly less than the diameter of the chamber, and inlet means for directing a dispersion into the rotor from at least one end thereof. Preferably a stationary shaft is mounted concentrically inside of the rotor to define an annular shear chamber with the inner surface of the rotor. In operation, the dispersion is fed into an end of the rotor, whence it flows along the interior of the rotor and through the openings in the rotor into the narrow annular space between the rotor and the chamber wall, whereafter it flows through the metering slot and exits from the extrusion orifice uniformly onto a web being coated by the dispersion.

It will readily be seen that the flow path area between the hopper inlet and the metering slot is substantially increased over the narrow annular area provided by the prior art, since substantially the entire chamber, less that space occupied by the shaft and rotor, is available as a flow path for the dispersion. Therefore, the dispersion reaches all points along the metering slot at substantially the same pressure, or at least within an acceptable range of pressure differential, and the variations in thickness caused by high pressure drops in prior art apparatus are avoided. Furthermore, high shear rate conditions are achieved while the dispersion is within the hopper since the dispersion undergoes numerous shearing actions as it proceeds through the hopper, e.g. it undergoes a first shearing action as a result of the relative motion of the rotor and the stationary shaft therein, a second shearing action as it passes through the rotor openings, a third shearing action due to the relative motion of the rotor and the chamber wall, plus the inherent shearing action resulting from the flow of the dispersion through the narrow annulus defined by the rotor and chamber wall, and a final shearing action as the dispersion flows through the metering slot. It will also be observed that the dispersion is continuously subjected to high shear rate conditions as it proceeds through the hopper. As noted above, if the dispersion is of the type which tends to decrease in viscosity as the shear rate increases, the shearing action serves the dual purpose of maintaining a uniform and fine consistency in the dispersion, and tends to reduce the viscosity of the dispersion, thereby decreasing its resistance to flow through the apparatus.

Moreover, the apparatus eliminates the entrance defect produced by the prior extrusion hopper. This result is achieved because, rather than employing a centrally located inlet port to the distribution chamber, the inlet port of the present invention directs the dispersion into an end of the rotor, whence it proceeds along the interior of the rotor and through the plurality of irregularly spaced rotor openings into the final stirring portion of the distribution chamber, which in effect provides multiple feed points into the outer annular space in the chamber, thereby eliminating any noticeable entrance defect in the coated product.

The drawings are essentially diagrammatic and are not necessarily to scale.

DESCRIPTION OF THE PREFERRED EMBODIMENT OF THE INVENTION

Figure 1:
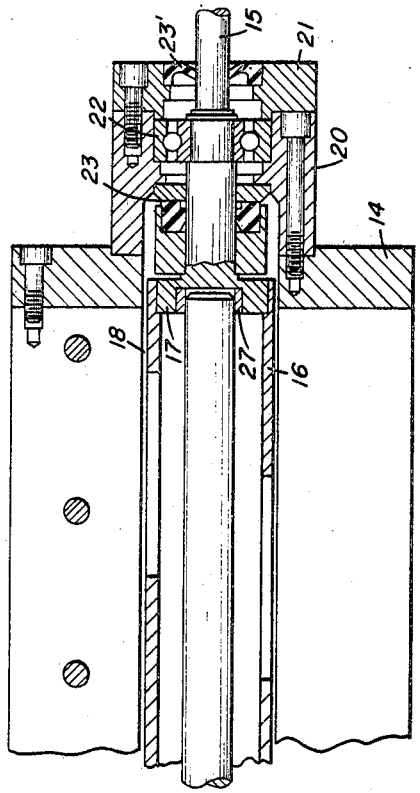
FIG. 1 is a partial longitudinal cross sectional view of the extrusion hopper constructed in accordance with a preferred embodiment of the invention, taken along the section line 1—1 in FIG. 2.
Figure 2:
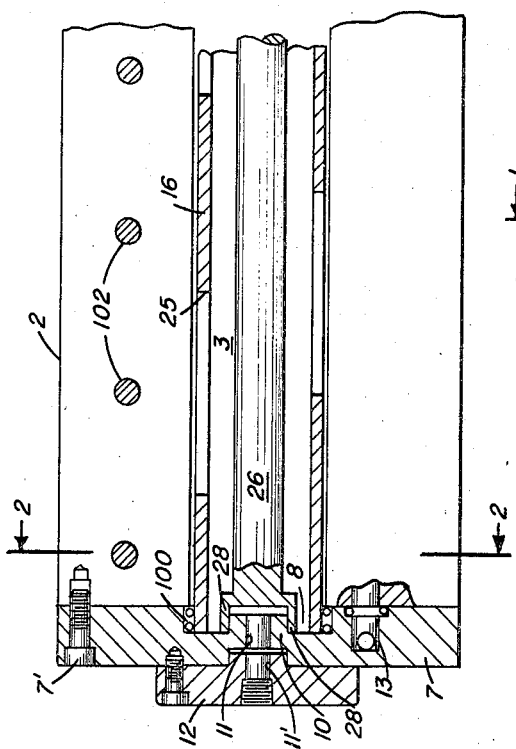
FIG. 2 is a full cross section of the extrusion hopper taken along the line 2—2 in FIG. 1.
Figure 2:
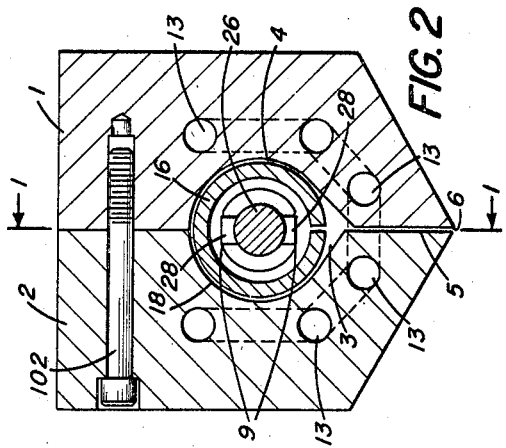

Referring to FIG. 2, the body of the hopper is constructed of two sections 1 and 2, which are fastened together by appropriate bolts or clamping means, one being shown at 102. Cooperating hollowed out positions of sections 1 and 2 form distribution chamber 3 within the hopper body, chamber 3 being a substantially cylindrical cavity defined by wall 4 and end portions to be described hereinafter. Sections 1 and 2 further cooperate to define metering slot 5 which extends along the length of distribution chamber 3 and radially outwardly therefrom, terminating in extrusion orifice 6. Metering slot 5 is shown in exaggerated form for clarity, and in practice has a width of only about .003 to .020 inch depending upon the final thickness of the coating desired. As shown in FIG. 1, the inlet end of the hopper is comprised of end plate 7 bolted to the ends of sections 1 and 2, one bolt 7' being shown. The plate 7 is provided with an annular recess 8 which is coaxial with, and has a slightly larger diameter than, the chamber 3. The inner wall of the recess 8 has diametrically opposite top and bottom portions flattened and notched, as shown at 9 in FIG. 2, to support the end of a stationary shaft as will be described below. The offset portion 10 of end plate 7 formed by annular recess 8 has an inlet 11 entering the end of the cavity 3 and which in alignment with a threaded inlet 11' is an end plate 12 bolted to the end of plate 7. The threaded end of a nipple on a feed tube, not shown, can be threaded into inlet 11' to feed the dispersion into the center of the end of the cavity 3.

A plurality of inter-connected passageways 13 are provided in body sections 1 and 2 through which a temperature regulating fluid can flow for controlling the temperature of material in chamber 3 in a manner more clearly shown in U.S. Patent 3,227,136. End plate 14 is fastened to the drive end of the hopper by appropriate connecting means, and supports drive shaft 15 and suitable packing and bearing means in a manner described below.

Referring now to FIG. 1, a tubular rotor 16 is mounted for rotation with flange 17 provided on drive shaft 15. Rotor 16 is substantially coextensive in length with distribution chamber 3, and is coaxial therewith. The outer diameter of rotor 16 is slightly less than the diameter of cylindrical chamber 3, so that a narrow annular space 18 is defined by the periphery of rotor 16 and the inner wtll 4 of chamber 3. Drive shaft 15 is coaxial with chamber 3 and extends therein through an opening in end plate 14. The end of the drive shaft 15 terminates in the cylindrical flange 17 on which rotor 16 is mounted, preferably by a press fit, and is further connected thereto by dowels (not shown) extending through rotor 16 into the periphery of flange 17. The other end of rotor 16 is supported by bearings 100 located between the rotor and the outside wall of the recess 18, see FIG. 1. The shaft 15 is supported at the entrance to the chamber by a bearing and packing assembly comprising a housing 20 bolted to the end plate 14 and covered by a cap 21 bolted to the end of the housing. This end of the drive shaft is rotatably supported by a bearing 22 and leakage of dispersion from the cavity 3 is prevented by packing glands 23 and 23'. While this arrangement in effect provides a cantilever mounting for the drive shaft and rotor combination, the bearings 100 at the free end of the rotor have been found to eliminate any whipping action the rotor might sustain and to allow rotational speeds of 1,000 r.p.m. before "chatter" becomes objectionable.

Figure 3:
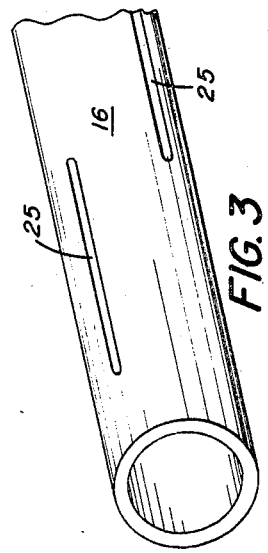
FIG. 3 is a perspective view of a portion of the rotor incorporated in a preferred embodiment of the instant invention.

Slots 25 are provided in rotor 16 as shown in FIGS. 2 and 3. The number and dimensions of the slots 25 depend on the flow rate and shear rate necessary to properly perform the extrusion process. Adjacent slots should not be colinear, because such an arrangement would tend to weaken rotor 16. Accordingly, the slots in adjacent rows along the length of rotor 16 should preferably be staggered, but the end of the slots of one row should be in the same transverse plane of the rotor 16 as the end of the slots in an adjacent row, thus simulating a continuous slot along the rotor 16 to avoid stagnant places within the rotor where dispersion will tend to remain rather than passing through the slots as the rotor rotates. According to a preferred embodiment employing a 12½ inch rotor, four rows of pairs of slots are provided along the length of the rotor 16, the slots of adjacent rows being 90° apart and the pair of slots within each row being 180° apart. The slots in that embodiment are about 3 inches along and 1/64 inch wide. No slots 25 should be within 3/8 inch from the unsupported end of rotor 16 in order to avoid weakening the rotor.

A shaft 26, as illustrated in FIGS. 1 and 2, is mounted coaxially in chamber 3 within rotor 16. The right hand end of shaft 26, looking at FIG. 1, is journalled within a recess in the flange 17 of the drive shaft 15 where it is supported by an appropriate bearing 27. The other end of shaft 26 terminates in a pair of diametrically disposed fingers 28 which engage the notched flats 9 on the inner wall of recess 8 in the end plate 7, see FIG. 2 to prevent the shaft 26 from turning. Looking at FIG. 1, it will be seen that the end of the shaft 26 is spaced from the end of the offset portion 10 of the end plate 7 so as to allow the dispersion being pumped into inlets 11 and 11' free access into the interior of the rotor 16.

The operation of the preferred embodiment is as follows: Drive shaft 15 is rotated by a motor (not shown) thereby causing the rotation of rotor 16 in distribution chamber 3. Shaft 26 remains stationary since it is fixed in end plate 7. Flange 17 rotates about the journalled end of shaft 26. The dispersion to be coated, for example a dispersion of magnetic oxide, is supplied by a suitable pump (not shown) to inlet port 11' from a reservoir (not shown) via a conduit (not shown). The dispersion proceeds through inlet 11 to the interior of rotating rotor 16. Flow is continuous, and the dispersion is subjected to a first shearing action due to the relative rotation of rotor 16 and shaft 26. As the dispersion continues to flow into rotor 16, the material therein is forced through slots 25 in rotor 16 into annular space 18 in a continuous and uniform manner throughout the length of the rotor 16. As the dispersion proceeds through slots 25, it is subjected to a second shear action. The shearing condition continues as the dispersion passes through outer annulus 18 because of the close clearance between rotor 16 and wall 4 of chamber 3, and because of the relative motion between rotor 16 and wall 4. Thereafter, the dispersion flows through narrow metering slot 5 where further a shearing action takes place, and the dispersion leaves the hopper through extrusion orifice 6, after which it is coated on a web (not shown) passing at a predetermined rate in a direction transverse to that of slot 5, such that the dispersion is properly coated on the web. It will be observed that the shear rate and flow rate are uniform across the length of the slot. Thus, the dispersion is subjected to a continuous shearing action from the time it enters the hopper until the time it is extruded from orifice 6.

Experimental results of the instant invention have clearly shown it to accomplish the intended objects of avoiding entrance defects and providing the proper coating of the web. The feeding of the dispersion axially into rotor 16, and its subsequent flow through slots 25, in effect provide multiple feed points for the dispersion into the final stage of distribution chamber 3, which results in negation of the entrance defect which is caused by a single, central feed port to the chamber. Furthermore, the maintenance of high shear rate conditions on the dispersion prevents agglomeration of the particles in the dispersion, thereby causing the extruded material to be of uniform consistency.

When inadequate shear conditions are maintained on magnetic dispersions in the type of hopper of the present invention, the coating tends to display a striated, "woody" pattern, as will result if the rotor 16 is at rest during the extrusion process. However, it has been found that rotational speeds of 200 to 500 r.p.m. of rotor 16 correct this condition, thus indicating that an adequate rate of shear has been achieved. Moreover, the coating thickness of the web has been found to be uniform throughout the length and across the width of the carrier web.

We claim:
1. An extrusion hopper comprising:
a body having formed therein a generally cylindrical elongated chamber having a peripheral wall, said body having a slot extending radially outwardly through said peripheral wall of said chamber and terminating in an extrusion orifice at the exterior of said body,
a tubular rotor generally coaxial with said chamber and mounted for rotation therein, the outer periphery of said rotor being spaced radially inwardly from said wall of said chamber, said rotor being provided with at least one opening extending generally radially therethrough,
inlet means opening into said chamber adjacent one end of said tubular rotor for passing the material to be extruded into the interior of said tubular rotor,
and means for coupling said tubular rotor to a rotary drive source.

2. An extrusion hopper according to claim 1 wherein the hopper further comprises a stationary shaft mounted concentrically within said rotor.

3. An extrusion hopper according to claim 1 wherein said rotor comprises a tubular member having a plurality of axially spaced rows of slots extending therethrough, all of said slots being generally coextensive in length and generally parallel to the longitudinal axis of said rotor, wherein the slots in adjacent rows of slots are in circumferentially staggered relationship with each other, and wherein the ends of slots in adjacent rows terminate in common planes transverse to said rotor, and wherein said rows are provided substantially across the length of said rotor.

4. An extrusion hopper according to claim 1 wherein said at least one opening in said tubular rotor comprises a plurality of slots generally parallel with the longitudinal axis of said tubular rotor and spaced along the length and around the circumference of said rotor in staggered relation.

5. An extrusion hopper according to claim 2 wherein said at least one opening in said tubular rotor comprises a plurality of slots generally parallel with the longitudinal axis of said tubular rotor and spaced along the length of said rotor.

6. An extrusion hopper according to claim 5 wherein said means for coupling said rotor to a rotary drive source is a rotatable drive shaft, said drive shaft extending into said chamber on the longitudinal axis thereof and having said tubular rotor mounted thereon for rotation therewith, said tubular rotor being supported at only one end on said drive shaft, whereby said tubular rotor is mounted as a cantilever on said drive shaft.

7. An extrusion hopper according to claim 6 wherein said inlet means comprises an offset portion at one end of said hopper extending coaxially into said tubular rotor and provided with an inlet extending coaxially therethrough, and said stationary shaft is fixedly mounted at one and to, and in coaxial relation with, said offset portion so as to leave said inlet open, and wherein said drive shaft enters said chamber at the end of said chamber opposite said inlet means, and the second end of said stationary shaft is journalled in said drive shaft.

8. An extrusion hopper according to claim 7 wherein said drive shaft extends a relatively short distance into said chamber, and a flange extending radially outwardly from the axis of said drive shaft is provided on the end of said drive shaft in the chamber, and wherein said rotor is concentrically mounted on the periphery of said flange.

References Cited
UNITED STATES PATENTS 3,227,136   1/1966   Bartlett et al. _____ 118—410

WALTER A. SCHEEL, Primary Examiner

J. P. McINTOSH, Assistant Examiner

U.S. Cl. X.R.

18—12; 118—410